(12) United States Patent
Mishra et al.

(10) Patent No.: US 10,911,305 B2
(45) Date of Patent: Feb. 2, 2021

(54) EFFICIENT RULE PROCESSING FOR DEVICE MANAGEMENT DATA EVALUATION

(71) Applicant: VMware, Inc., Palo Alto, CA (US)

(72) Inventors: Abhishek Mishra, Atlanta, GA (US); Adam Michael Hardy, Alpharetta, GA (US); Zundra Daniel, Atlanta, GA (US); Aashima Madaan, Atlanta, GA (US); Sriram Devalapalli, Palo Alto, CA (US); Joshua Glenn Broch, Atlanta, GA (US); Sangeeta Soman, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 37 days.

(21) Appl. No.: 16/145,395

(22) Filed: Sep. 28, 2018

(65) Prior Publication Data
US 2020/0106670 A1 Apr. 2, 2020

(51) Int. Cl.
*H04L 12/24* (2006.01)
*H04L 29/08* (2006.01)

(52) U.S. Cl.
CPC .......... *H04L 41/0853* (2013.01); *H04L 41/22* (2013.01); *H04L 67/20* (2013.01)

(58) Field of Classification Search
CPC ...... H04L 41/0853; H04L 41/22; H04L 67/20
USPC .......................................................... 709/224
See application file for complete search history.

(56) References Cited

U.S. PATENT DOCUMENTS

| | | | |
|---|---|---|---|
| 2012/0173682 A1* | 7/2012 | Mantere | G06F 9/44505 709/221 |
| 2015/0074248 A1* | 3/2015 | Taylor | G06F 9/4411 709/220 |
| 2017/0085650 A1* | 3/2017 | Mungo | H04W 4/70 |
| 2017/0118074 A1* | 4/2017 | Feinstein | H04L 67/2842 |

* cited by examiner

*Primary Examiner* — Tauqir Hussain
(74) *Attorney, Agent, or Firm* — Thomas | Horstemeyer, LLP

(57) ABSTRACT

Various examples for performing rule processing for device management data evaluation are described. According to some examples, one or more computing devices can receive new device data from a client device indicative of a current configuration of the client device and identify a change of a device configuration value from a past device configuration value by comparing the new device data to historic device data. The computing devices can send the new device data to a rule evaluation service to identify one or more rules associated with the device configuration value a rule action service to perform an action specified in the rules. The rule action service can determine the action to perform based on the device configuration value.

20 Claims, 8 Drawing Sheets

EFFICIENT RULE PROCESSING FOR DEVICE MANAGEMENT DATA EVALUATION

BACKGROUND

Various operating systems offer mobile device management (MDM) capabilities that permit third-party applications to secure and oversee operation of a device. Unified endpoint management (UEM) solutions enable administrators of enterprises and other organizations to secure and oversee the operation of a multitude of various types of devices having various types of operating systems and MDM capabilities, such as smartphones, desktop computers, laptops, tablets, and peripheral devices. Generally, UEM solutions include a management service hosted in a remote computing environment, where the management service permits administrators to secure and oversee operation of the multitude of devices through a single portal, referred to as an administrator console.

Some UEM solutions permit the enforcement of device compliance. In other words, devices must act in accordance with various rules (or "compliance rules") specified by the administrator in order for a device to remain in compliance with a management service. Device compliance can ensure that devices act in a manner that prevents or reduces the dissemination of proprietary data through social engineering techniques, viruses, jailbreaks, rootkits, or similar vulnerabilities that create security risks on a device.

The evaluation of rules and other criteria is generally performed by the management service. However, in scenarios where a management service oversees hundreds to thousands of devices, it remains difficult for a computing device to verify device compliance. For instance, a single endpoint is required to periodically check-in with the hundreds to thousands of devices and perform various tasks on data received from the devices, which consumes bandwidth and processing time.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to rule processing for device management data evaluation. Administrators, such as information technology (IT) personnel, of an enterprise or other organization can utilize a management service to secure and oversee operation of devices enrolled with the management service. Through an administrator console provided by the management service, administrators can define actions or events to occur when predefined criteria has been met by one or more of the devices. For instance, if a state of a device indicates that the device is a security risk to enterprise data, the administrator can take remedial actions through the management service, such as removing the device from a network, requiring the device to perform a virus scan, or other action.

Traditionally, the evaluation of rule or compliance rules is generally performed by the management service executing in a computing environment. However, in scenarios where the management service oversees hundreds to thousands of client devices, it remains problematic for the computing environment alone to verify device compliance while performing other tasks. For instance, the computing environment is required to periodically receive check-in data from hundreds to thousands of devices and perform various tasks on the data received from those devices. This consumes a large amount of bandwidth and increased computational processing time. Also, the solution does not scale easily when more client devices are enrolled with the management service.

As such, in various examples described herein, a management service is described that interacts with various remotely-hosted web services to delegate processing of device data. As can be appreciated, the web services can include on-demand cloud computing platforms that permit access to a virtual cluster of computing resources. In some examples, a first one of the web services can include an event-driven web service, a second one of the web services can include a rule evaluation service, and a third one of the web services can include a rule action service, as will be described. Each one of the web services may be independent of one another and perform a preconfigured set of tasks to divide processing of device data.

For instance, if the event-driven web service detects a change in a device configuration value from historic device data, the event-driven web can communicate the device data to the rule evaluation service. The rule evaluation service can determine whether any rules exist that are associated with the change in device configuration values. For instance, if an administrator of the management service desires to detect when an operator of a client device has upgraded an operating system of a client device and, in response, desires the operator of the device to revert the operating system to a prior version, the administrator can specify tasks that direct the device to revert to the prior version of the operating system.

Figure 1:
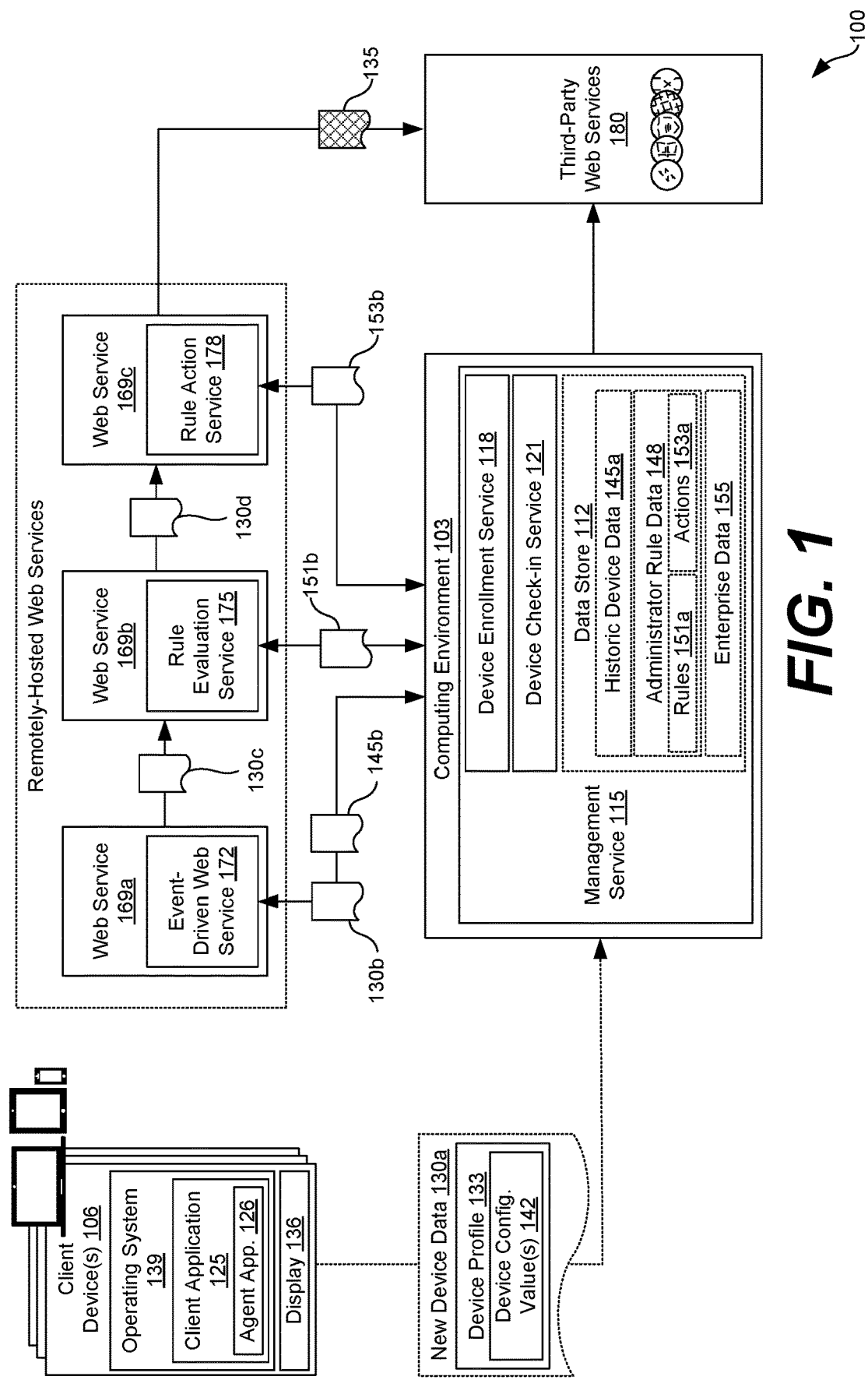
FIG. 1 is a drawing of a networked environment that provides efficient rule processing for device management data evaluations.

Turning now to FIG. 1, an example of a networked environment 100 is shown. The networked environment 100 can include a computing environment 103 and one or more client devices 106 in data communication with one other over a network. The network can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, telephony networks, and other types of networks.

The computing environment 103 can include, for example, a server computer or any other system providing computing capability. Alternatively, the computing environment 103 can include a plurality of computing devices that are arranged, for example, in one or more server banks, computer banks, or other arrangements. The computing environments 103 can include a grid computing resource or any other distributed computing arrangement. The computing devices can be located in a single installation or can be distributed among many different geographical locations.

The computing environment 103 can also include or be operated as one or more virtualized computer instances. For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the client device 106 remotely over the network, the computing environment 103 can be described as a remote computing environment 103.

The data store 112 can include memory of the computing environment 103, mass storage resources of the computing environment 103, or any other storage resources on which data can be stored by the computing environment 103. The data stored in the data store 112, for example, can be associated with the operation of the various applications or functional entities described below.

The components executed on the computing environment 103 can include, for example, a management service 115 as well as other applications, services, processes, systems, engines, or functionality not discussed in detail herein. The management service 115 can be executed to oversee the operation of client devices 106, for instance, those enrolled with the management service 115. In some examples, an organization, such as a company, enterprise, or other entity, can operate the management service 115 to oversee or manage the operation of the client devices 106 of its employees, contractors, customers, or other individuals having accounts with the enterprise.

In some examples, the management service 115 can include a device enrollment service 118, a device check-in service 121, as well as other applications, services, processes, systems, engines, or functionality not discussed in detail herein.

The management service 115, as well as the device enrollment service 118 and the device check-in service 121, can interact with one or more client applications 125 executed on the client devices 106. In one example, the device enrollment service 118 interacts with an agent application 126 on a client device 106 to enroll the client device 106 with the management service 115. Enrollment can include authenticating the client device 106 using login information, such as an email address, username, or password, as well as device information or biometric information. In some examples, the agent application 126 can include a client application 125 that can be registered as a device administrator of the client device 106, which can provide the agent application 126 with sufficient privileges to control the operation of the client device 106. The agent application 126 can configure a client device 106 in accordance with data provided to the client device 106, referred to as a configuration profile. In some examples, the configuration profile can include an extensible markup language (XML) document that causes the agent application 126 to configure the client device 106 in accordance with settings or other parameters specified in the XML document.

The device check-in service 121 can instruct the client device 106 to check-in with the management service 115. In some examples, the device check-in service 121 interacts with the agent application 126 on the client device 106 to check-in with the management service 115 by transmitting new device data 130 to the management service 115. In some examples, the agent application 126 can check-in with the management service 115 at predefined intervals. In additional examples, the agent application 126 can check-in with the management service 115 at the requestor instruction of the device check-in service 121.

The new device data 130a . . . 130d can include data pertaining to the configuration or operation of the client device 106. In some examples, the new device data 130 can include a device profile 133 that includes hardware or software settings of the client device 106. Hardware settings can include user-specified configurations and other data pertaining to a display 136, camera, speaker, or other hardware of the client device 106. Software settings can include user-specification configurations or other data pertaining to an operating system 139, client applications 125, or other software of the client device 106. For instance, software settings can include a list of installed client applications 125, as well as configurations or settings of the installed client applications 125.

The device profile 133 can include an XML, file, data structure, or other object having one or more device configuration values 142 contained therein. The device configuration values 142 can be associated with a category or a variable name in some examples. For instance, assuming the device profile 133 contained a variable of "is_roaming_enabled," the device configuration values 142 can include "yes" or "no," depending on whether roaming functionality has been enabled or disabled on the client device 106. In another example, assuming the device profile 133 contained variables of "gps_longitude" and "gps_latititude," the device configuration values 142 can include longitudinal and latitudinal coordinates, respectively.

In some examples, the device configuration values 142 can include metrics pertaining to the performance or operation of the hardware or software of the client device 106. For instance, the agent application 126 can generate metrics pertaining to the health of a battery, display, or other hardware or software of the client device 106.

The data stored in the data store 112 can include, for example, historic device data 145a . . . 145b, administrator rule data 148, enterprise data 155, as well as other data. Generally, historic device data 145 can include data pertaining to a client device 106 enrolled or managed by the management service 115 stored in the data store 112. For instance, when a client device 106 checks in with the management service 115, the management service 115 can store the device profile 133 or other data received during the check-in as historic device data 145. As such, the management service 115 can maintain historic device data 145 for client devices 106 enrolled with the management service 115, where the historic device data 145 describes past configurations of the client devices 106.

Administrator rule data 148 can include settings, policies, compliance rules, or other data generated by an administrator in order to secure or oversee operation of client devices 106 enrolled with the management service 115. In some examples, the administrator rule data 148 includes client applications 125 or resources, such as files, documents, or other resources, to be installed on the client device 106. In additional examples, the administrator rule data 148 includes policies to be enforced on the client device 106 by the agent application 126. In some examples, the administrator rule data 148 includes criteria pertaining to one or more client devices 106 enrolled with the management service 115 that, when satisfied, cause one or more actions to be automatically performed, referred to as rules 151a ... 151b. The administrator rule data 148 can also include actions 153a ... 153b to be performed when evaluation of criteria specified by a rule 151 has been satisfied.

In various examples, the management service 115 can generate one or more user interfaces that obtain information about the configuration of client devices 106 enrolled (or to be enrolled) with the management service 115. Through these user interfaces, an administrator can provide information regarding how the administrator desires to configure the client devices 106. In one example, the administrator can specify one or more client applications 125 to be installed on the client device 106. In another example, the administrator can specify settings to be configured on a client device 106, such as Wi-Fi network settings, VPN settings, email server settings, or other settings. Based on the settings specified by the administrator, the management service 115 can generate a configuration profile that is published for one or more client devices 106. When published, the agent application 126 on the client device 106 can identify the configuration profile as being applicable to the client device 106 and, as a result, will download and configure the client device 106 in accordance with the settings set forth in the configuration profile. Further, the one or more user interfaces can permit the administrator to specify rules 151 and actions 153 to be performed based on the rules 151. Rules 151 can include criteria pertaining to new device data 130 in some examples. For instance, an administrator can cause an action 153 to be performed depending on a particular device configuration value 142.

In some examples, the rules 151 include constraints specified by an administrator for a client device 106 to be in "compliance" with the management service 115. In one example, the agent application 126 can configure hardware or software functionality of a client device 106 such that the client device 106 operates in conformance with the compliance-type rules 151 (referred to as compliance rules 151). Additionally, the management service 115 can identify when the client device 106 is not in conformance with the rules 151 and can take appropriate remedial actions, such as denying access to enterprise data 155.

In some examples, the management service 115 communicates with the agent application 126 or other client application 125 executable on the client device 106 to determine whether vulnerabilities exist on the client device 106 that do not satisfy policies defined by an administrator. Vulnerabilities can include, for example, the presence of a virus or malware on the client device 106, the client device 106 being "rooted" or "jailbroken" where root access is provided to a user of the client device 106, the presence of particular applications or files, questionable device configurations, vulnerable versions of client applications 125, or other vulnerability as can be appreciated.

The client device 106 can include a processor-based system, such as a computer system, that can include a desktop computer, a laptop computer, a personal digital assistant, a cellular telephone, a smartphone, a set-top box, a music player, a tablet computer system, a game console, an electronic book reader, a peripheral device, or any other device with like capability. The client device 106 can also be equipped with networking capability or networking interfaces, including a localized networking or communication capability, such as a near-field communication (NFC) capability, radio-frequency identification (RFID) read or write capability, or other localized communication capability.

The client device 106 can include an operating system 139 configured to execute various client applications 125, such as the agent application 126, as well as other applications. Some client applications 125 can access enterprise data 155 and other network content served up by the computing environment 103 or other servers, thereby rendering a user interface on a display 136, such as a liquid crystal display (LCD), touch-screen display, or other type of display device. To this end, some client applications 125 can include a browser or a dedicated application, and a user interface can include a network page, an application screen, or other interface. Further, other client applications 125 can include device management applications, enterprise applications, social networking applications, word processors, spreadsheet applications, media viewing applications, or other applications.

As noted above, administrators of the management service 115 can define actions to automatically conduct when predefined criteria has been met by one or more of the client devices 106. For instance, an administrator can specify a rule 151 that includes criteria associated with one or more of the device configuration values 142. When the criteria has been satisfied, the management service 115 can cause performance of the action.

Traditionally, the evaluation of rule 151 or compliance rules 151 is generally performed by the management service 115. However, in scenarios where the management service 115 oversees hundreds to thousands of client devices 106, it remains difficult for the computing environment 103 alone to verify device compliance. For instance, the computing environment 103 would be required to periodically check-in with the hundreds to thousands of client devices 106 and perform various tasks on new device data 130 received from the client devices 106, consuming bandwidth and processing time. Also, the solution does not scale easily when more client devices 106 are enrolled with the management service 115.

As such, in some examples, the management service 115 can delegate processing of the new device data 130 to web services 169a ... 169c. As can be appreciated, the web services 169a ... 169c can be remotely-hosted and can include on-demand cloud computing platforms that permit access to a virtual cluster of computing resources.

The web services 169a ... 106c can include pre-loaded applications, such as web server applications, database applications, among others. In some examples, a first one of the web services 169a can include an event-driven web service 172, a second one of the web services 169b can include a rule evaluation service 175, and a third one of the web services 169c can include a rule action service 178.

The event-driven web service 172 can include a web service 169 that only executes upon receipt of an event. To this end, in some examples, the event-driven web service 172 will only execute upon receipt of new device data 130a. In other words, when a client device 106 checks in with the management service 115, the new device data 130 can be routed to the event-driven web service 172. In some examples, the event-driven web service 172 can be configured to compare new device data 130 to historic device data 145 and determine whether there has been any changes in device configuration values 142. In other words, the event-driven web service 172 can be configured to identify any changes in configurations or other settings occurring on a client device remotely based on an inspection of new device data 130 and historic device data 145. As can be appreciated, by only executing when new device data 130 is received, computational resources are not unnecessarily used by maintaining a web service 169 executing 24 hours a day, seven days a week.

If the event-driven web service 172 detects a change in a device configuration value 142, the event-driven web service 172 can communicate the new device data 130 (or a relevant portion thereof) to the rule evaluation service 175. The rule evaluation service 175 can be configured to determine whether any rules 151 exist that are associated with the change in device configuration values 142. For instance, assume an administrator of the management service 115 desires to detect when an operator of a client device 106 has disabled a wireless fidelity (Wi-Fi) capability of the client device 106 and, in response, desires the operator of the client device 106 to receive an email with instructions how to re-enable the Wi-Fi capability. It is understood that the new device data 130 can include a variable name "wifi_enabled" and the device configuration value 142 has changed to "false." The event-driven web service 172 will identify the change from the device configuration value 142 of "true" (stored as historic device data 145) to "false" (received as new device data 130). The rule evaluation service 175 can determine whether any rules 151 are associated with the "wifi_enabled" category. In this case, the rule evaluation service 175 would identify the rule 151 associated with the "wifi_enabled" category and communicate the new device data 130 (or relevant portion thereof) to the rule action service 178.

The rule action service 178 is configured to carry out an action associated with the rule 151, for instance, based on the device configuration value 142. In the example above, the rule action service 178 can be configured to send a request to one or more third-party web services 180 that cause an email to be sent to the operator to the client device 106 with instructions how to re-enable Wi-Fi capability on the client device 106. Depending on the type of third-party web service 180 to be used in performing an action, the rule action service 178 can generate a request 135 having a payload generated in accordance with specifications of the third-party web service 180.

Figure 2:
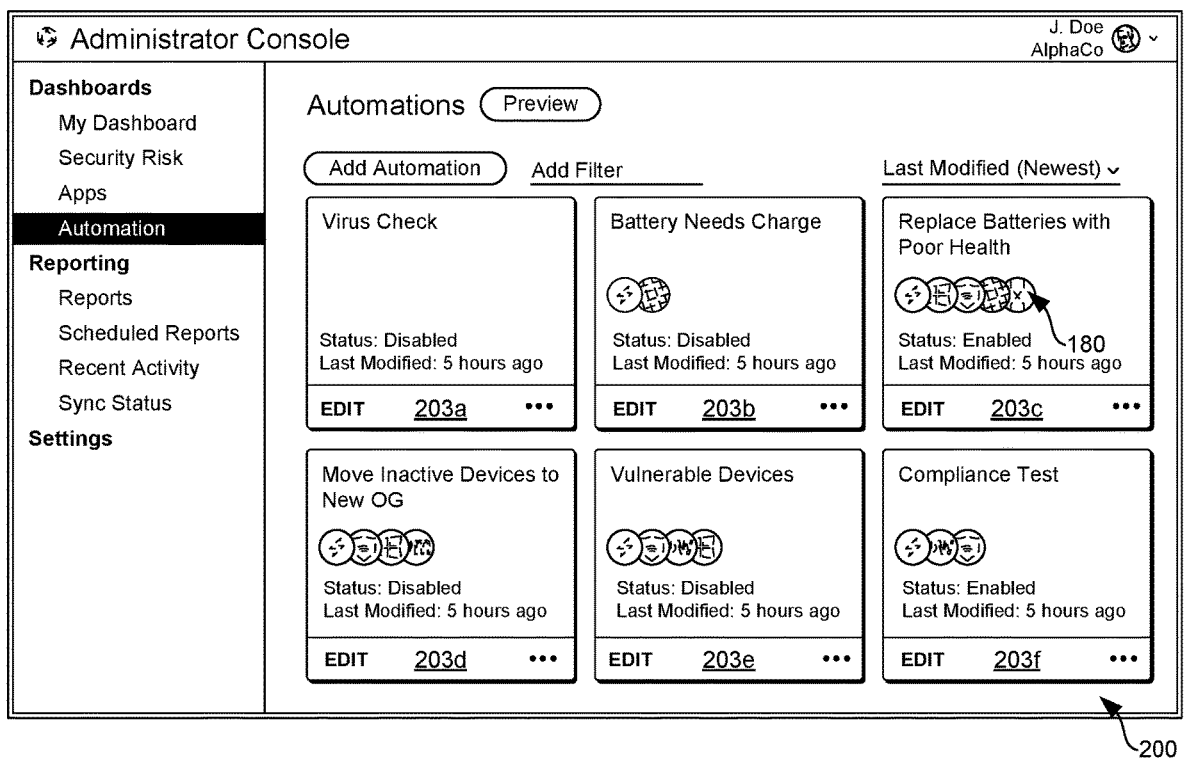
FIGS. 2 and 3 are user interfaces that permit an administrator to customize actions for the networked environment to perform when a device matches criteria specified by the administrator.

Referring next to FIG. 2, an example of a user interface 200 is shown. More specifically, the user interface 200 of FIG. 2 can include a user interface that permits an administrator to specify rules 151, actions 153, as well as other information associated with operation of the client devices 106 enrolled the management service 115. For instance, an administrator can create and customize automations 203a . . . 203f, which include an action 153 or group of actions 153 to perform when predefined criteria is satisfied associated with operation of the client devices 106. By specifying the predefined criteria, the management service 115 can generate rules 151 that can be analyzed by the rule evaluation service 175 and the rule action service 178. The user interface 200 can show icons for the third-party web services 180 invoked by a particular one of the automations 203.

Figure 3:
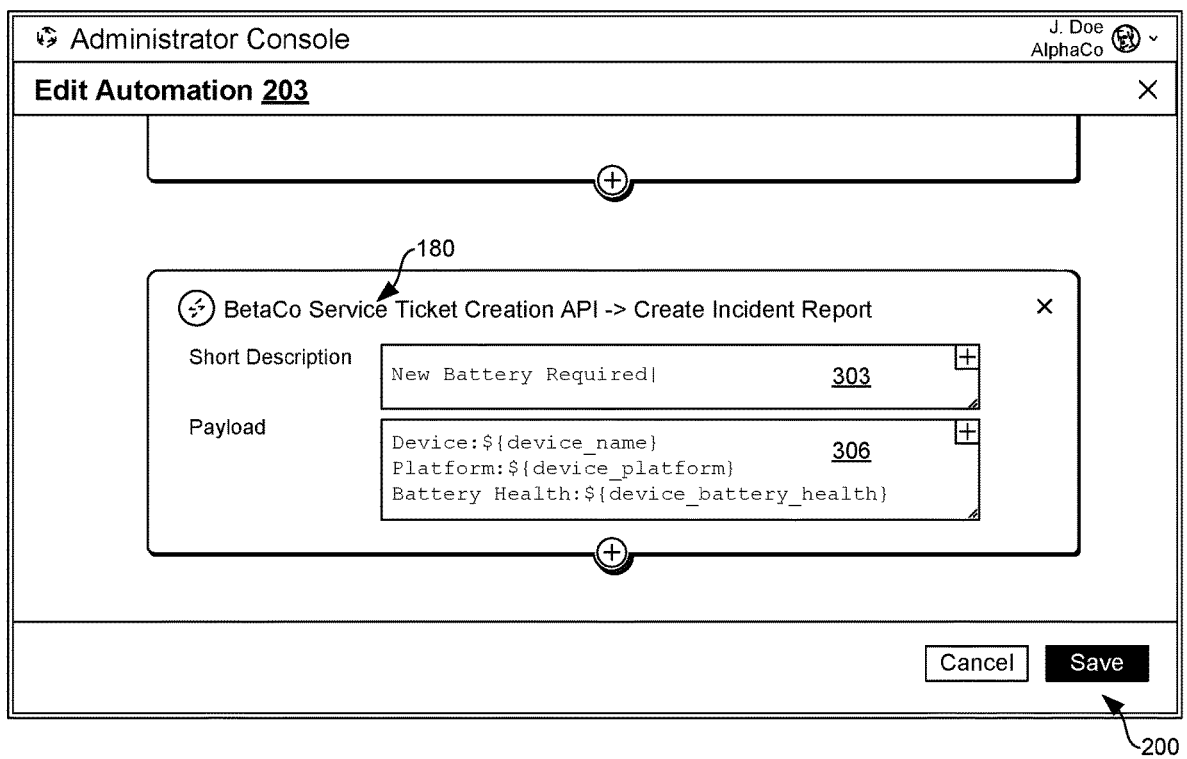

Turning now to FIG. 3, another example of a user interface 200 is shown. Specifically, the user interface 200 of FIG. 3 shows an example of an automation 203 that creates a ticket or an incident report when a battery of a client device 106 is failing. As noted above, the agent application 126 can deliver metrics associated with the performance of hardware, such as the battery, to the management service 115. An administrator can define a rule 151 that causes a ticket to be created, for instance, when the health of the battery falls below a predetermined value.

In the example of FIG. 3, the automation 203 permits the administrator to interact with a third-party web service 180 ("BetaCo Service Ticket Creation API") to create the ticket. A first text field 303 permits a short description of the automation 203 for future evaluation of the automation 203. A second text field 306 permits the customization of the payload delivered to the third-party web service 180. For instance, a device name, a device platform, and the device battery health can be included in the ticket created by the BetaCo Service Ticket Creation API. It is understood that the user interface 200 of FIG. 3 can include additional form fields depending on the inputs, settings, or other parameters of the third-party web service 180 being invoked. As such, the administrator is provided with an increased flexibility for customizing a UEM environment depending on the needs of its organization.

Figure 4:
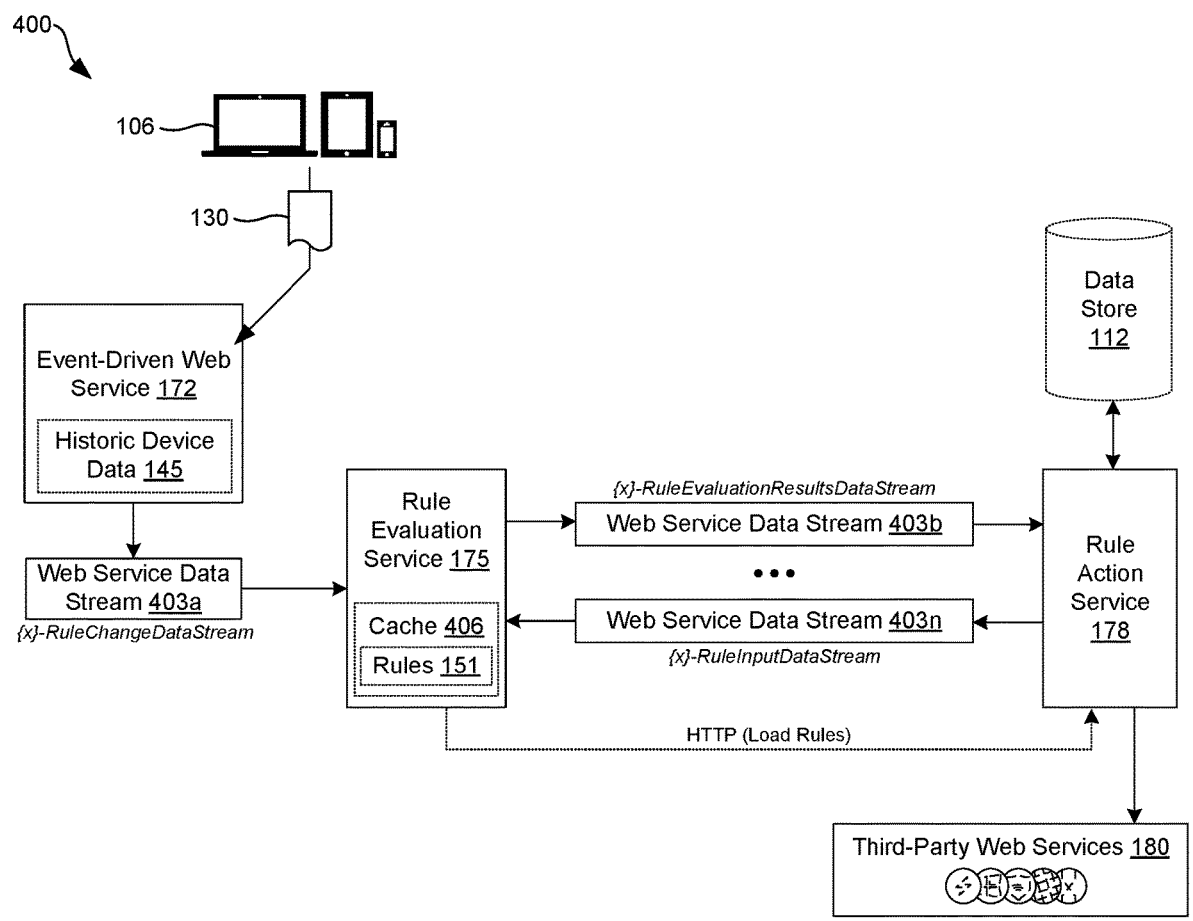
FIG. 4 is a schematic diagram describing various web services that can be utilized to evaluate rules as new device data is received from enrolled devices.

Turning now to FIG. 4, a schematic diagram 400 is shown having the web services 169 that can be utilized to evaluate rules 151 as new device data 130 is received from client devices 106 enrolled with the management service 115. In some examples, the management service 115 can assign processing of the new device data 130 to various web services 169, such as the event-driven web service 172, the rule evaluation service 175, the rule action service 178, as well as other services. As can be appreciated, the web services 169 can scale more efficiently than using resources of the management service 115, use less bandwidth, and free up computational resources of the management service 115 for other tasks.

A client device 106 can periodically send device data to the management service 115. The management service 115 can store the device data as historic device data 145, which can be accessed by the event-driven web service 172. The event-driven web service 172 can be configured to compare new device data 130 to historic device data 145 to determine whether there has been any changes in device configuration values 142. As such, the event-driven web service 172 can identify any changes in configurations or other settings occurring on a client device 106 remotely by comparing the new device data 130 to the historic device data 145.

In some examples, the event-driven web service 172 can include a web service 169 that only executes in an instance in which an event is received. Hence, the event-driven web service 172 will only execute in response to receipt of new device data 130. As can be appreciated, by only executing when new device data 130 is received, computational resources are not unnecessarily used by maintaining a web service 169 having 24/7 uptime.

In some examples, the event-driven web service 172, the rule evaluation service 175, and the rule action service 178 send communications using one or more web service data streams 403a . . . 403n. For instance, if the event-driven web service 172 detects a change in a device configuration value 142, the event-driven web service 172 can communicate the new device data 130 (or a relevant portion thereof) to the web service data stream 403, which is accessed by the rule evaluation service 175.

The rule evaluation service 175 can be configured to determine whether any rules 151 exist that are associated with the change in device configuration values 142. For instance, assume an administrator of the management service 115 desires to detect when an operator of a client device 106 has uninstalled an anti-virus application on the client device 106. In response, the administrator may desire to notify the operator of the client device 106 that his or her device is out of compliance and provide the operator of the client device 106 with a predetermined amount of time prior to disabling access to enterprise data 155 or otherwise disabling functionality of the client device 106.

It is understood that the new device data 130 can include a variable name "anti_virus_installed" and the device configuration value 142 has changed to "no." The event-driven web service 172 can identify the change from the device configuration value 142 of "yes" (stored as historic device data 145) to "no" received as new device data 130. The rule evaluation service 175 can determine whether any rules 151 are associated with the "anti_virus_installed" category, which can be specified by the administrator using the user interfaces 200 of FIGS. 2 and 3. In this case, the rule evaluation service 175 can identify a rule 151 associated with the "anti_virus_installed" category and communicate the new device data 130 (or relevant portion thereof) to the rule action service 178 through a relevant one of the web service data streams 403.

In some examples, the rule evaluation service 175 can receive definition of rules 151 from the management service 115 for storage locally. For instance, the rule evaluation service 175 can store rules 151 in cache 406 or other local memory for more efficient access and faster queries.

The rule action service 178 is configured to carry out an action 153 associated with the rule 151, for instance, based on the device configuration value 142. In the example above, the rule action service 178 can be configured to send a request to one or more third-party web services 180 that causes an email to be sent to the client device 106 with instructions on how to reinstall the anti-virus application and/or notify the operator that his or her device is out of compliance. Depending on the type of third-party web service 180 to be used in performing an action, the rule action service 178 can generate a request 135 having a payload generated in accordance with specifications of the third-party web service 180. In some examples, the rule action service 178 can interact with the management service 115 to disable functionality on the client device 106, such as the ability to access enterprise data 155.

Figure 5:
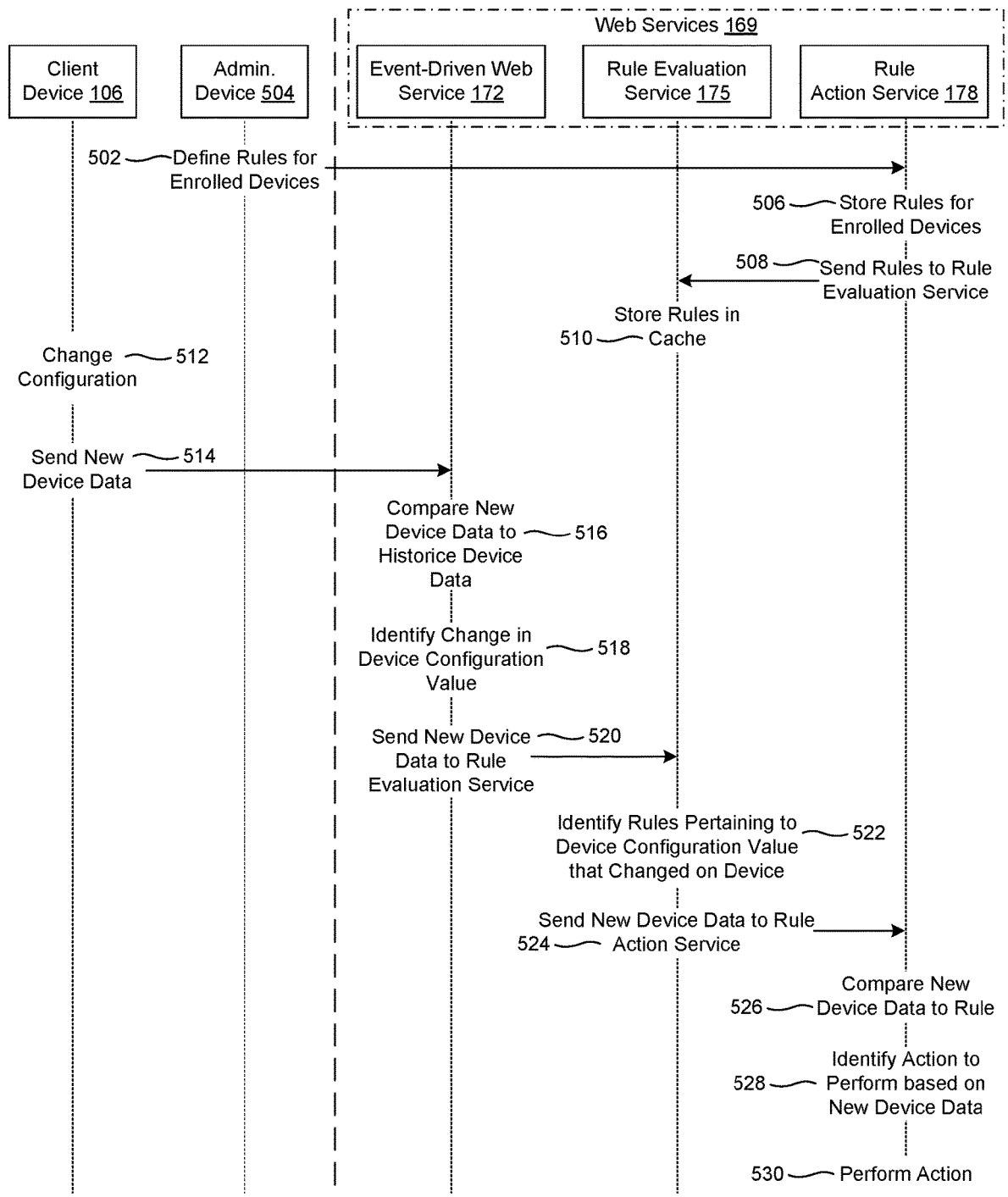
FIG. 5 is a sequence diagram for processing device data received from enrolled devices and performing various actions based on rules specified by an administrator.

Referring now to FIG. 5, a sequence diagram 500 is shown that provides one example of processing rules 151 in a networked environment 100. The sequence diagram of FIG. 5 can be viewed as depicting an example of elements of a method implemented by the various applications, devices, and services executing in the networked environment 100 of FIG. 1 according to one or more examples. The separation or segmentation of functionality as discussed herein is presented for illustrative purposes only.

Beginning with step 502, an administrator can access an administrator device 504 to define rules 151 for client devices 106 enrolled with the management service 115. As can be appreciated, the administrator device 504 can include one of the client devices 106 having administrator privileges. The administrator can specify the rules 151 using the user interfaces 200 of FIGS. 2 and 3, or other similar user interfaces 200. It is understood that the management service 115 stores the rules 151 as administrator rule data 148.

In step 506, in some examples, the rule action service 178 can access the rules 151 defined using the management service 115 and store the rules 151 locally for evaluation. Additionally, in step 508, the rule action service 178 can send the rules 151 to the rule evaluation service 175.

In step 510, the rule evaluation service 175 can store the rules 151 locally as well, for instance, by storing the rules 151 in cache 406 or other memory. By storing the rules 151 in cache 406, the rule evaluation service 175 can quickly retrieve rules 151 and process new device data 130.

In step 512, the client device 106 can change its configuration. For instance, the operator of the client device 106 can remove a client application 125, upgrade or revert to a past version of a client application 125, adjust a hardware or software setting, or perform another action that could be of interest to an administrator overseeing operation of the client device 106.

In step 514, the client device 106 can send new device data 130 to the management service 115 and/or the event-driven web service 172. It is understood that the change in the configuration of the client device occurring in step 512 will be described in the new device data 130. For instance, if the operator of the client device 106 uninstalled a necessary client application 125 on the client device 106, the new device data 130 will include data indicating that the client application 125 is no longer present on the client device 106.

Thereafter, in step 516, the event-driven web service 172 will compare the new device data 130 to the historic device data 145 to determine whether a change of a device configuration value 152 has occurred. Referring to the example above, if an operator of a client device 106 removed a necessary anti-malware application on the client device 106, the event-driven web service 172 will identify the change by comparing the new device data 130 to the historic device data 145. As such, in step 518, the event-driven web service 172 can identify the change in the device configuration value 152.

In step 520, the event-driven web service 172 can send the new device data 130 to the rule evaluation service 175 for further analysis. As such, the event-driven web service 172 merely determines whether a change exists between new device data 130 and historic device data 145.

In step 522, the rule evaluation service 175 can identify rules 151 pertaining to the device configuration value 142 or category associated therewith. For instance, if the configuration of the client device 106 changed the device configuration value 142 for "wifi_enabled" from "true" to "false," the rule evaluation service 175 can determine whether any rules 151 exist that are interested in the "wifi_enabled" category. In step 524, if the rule evaluation service 175 identifies one or more rules 151 associated with the "wifi_enabled" category, the rule evaluation service 175 can communicate the new device data 130 to the rule action service 178.

In step 526, the rule action service 178 can compare the new device data 130 to the rule 151, for instance, to identify which action 153 to perform based on the device configuration value 143 in the new device data 130 (step 528). In some examples, the action 153 can include disabling functionality of the client device 106, causing a remedial action to be performed on the client device 106, or otherwise communicating with a third-party web service 180 configured to carry out a particular task. For example, the rule action service 178 can be configured to send a request to one or more third-party web services 180 that causes an email, text message, or push notification to be sent to the operator to the client device 106 with instructions how to re-enable Wi-Fi capability on the client device 106.

In step 530, the rule action service 178 can perform or otherwise cause performance of the action 153 specified in association with the rule 151. In some examples, the rule action service 178 can generate, depending on the type of third-party web service 180 to be used in performing an action, a request 135 having a payload generated in accordance with specifications of the third-party web service 180.

Thereafter, the process can proceed to completion. It is understood, however, that the process can revert back to step 512, for instance, in an instance when a change in the configuration of the client device 106 is identified.

Figure 6:
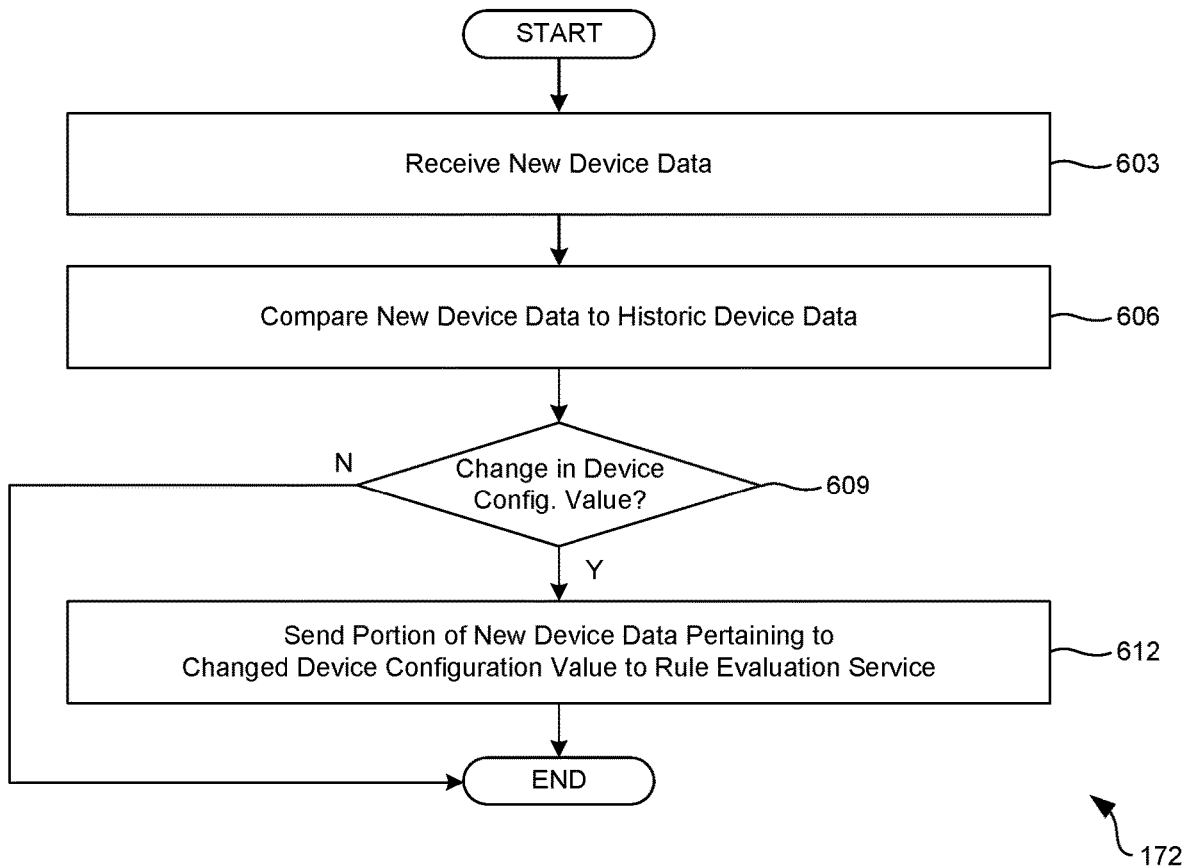
FIG. 6 is a flowchart showing an example operation of an event-driven web service according to various examples.

Moving on to FIG. 6, shown is a flowchart that provides one example operation of a web service 169 according to various examples. The flowchart of FIG. 6 can be viewed as depicting an example of elements of a method implemented by the event-driven web service 172 executing in the networked environment 100 according to one or more examples. The separation or segmentation of functionality as discussed herein is presented for illustrative purposes only.

It is understood that the configuration of a client device 106 is likely to change as the client device 106 is used by its operator. For instance, the operator of the client device 106 may periodically adjust settings, disable or enable hardware, remove or install applications, or browse the Internet. The changes to the client device 106 can be of interest to the administrator of the management service 115 when securing or overseeing operation of the client device 106. As such, an agent application 126 executing on the client device 106 can periodically check-in with the management service 115 by sending a device profile 133 to the management service 115. The device profile 133 can include new device data 130 that can be the same as or different from historic device data 145.

Beginning with step 603, the event-driven web service 172 can receive new device data 130 from the client device 106 or the management service 115. It is understood that the new device data 130 can be received from the client device 106 based on a periodic or otherwise scheduled check-in or upon request by the management service 115.

In step 606, the event-driven web service 172 can compare the new device data 130 to the historic device data 145, for instance, to determine whether a change of a device configuration value 152 has occurred. Thus, in step 609, the event-driven web service 172 can determine whether a device configuration value 142 for a particular variable has changed from a past device configuration value 142 stored as historic device data 145. For instance, if an operator of a client device 106 reverted to a legacy version of a client application 125 having one or more security vulnerabilities, the event-driven web service 172 can identify the change by comparing the new device data 130 to the historic device data 145.

If there is no change in the device configuration value 143 based on the comparison performed in step 606, the process can proceed to completion as no rule analysis is necessary. Referring back to step 609, if a change in a device configuration value 143 has occurred, the process can proceed to step 612.

In step 612, the event-driven web service 172 can send the new device data 130 to the rule evaluation service 175 for further analysis. In some examples, the event-driven web service 172 can send the new device data 130, or relevant portion thereof, to a web service data stream 403. In some examples, a web service data stream 403 can be configured to receive only new device data 130 relevant to a particular category or group of categories. For instance, a first web service data stream 403a can receive data associated with changes to "wifi_enabled" settings while a second web service data stream 403b can receive data associated with changes to "bluetooth enabled" settings. Thereafter, the process can proceed to completion.

Figure 7:
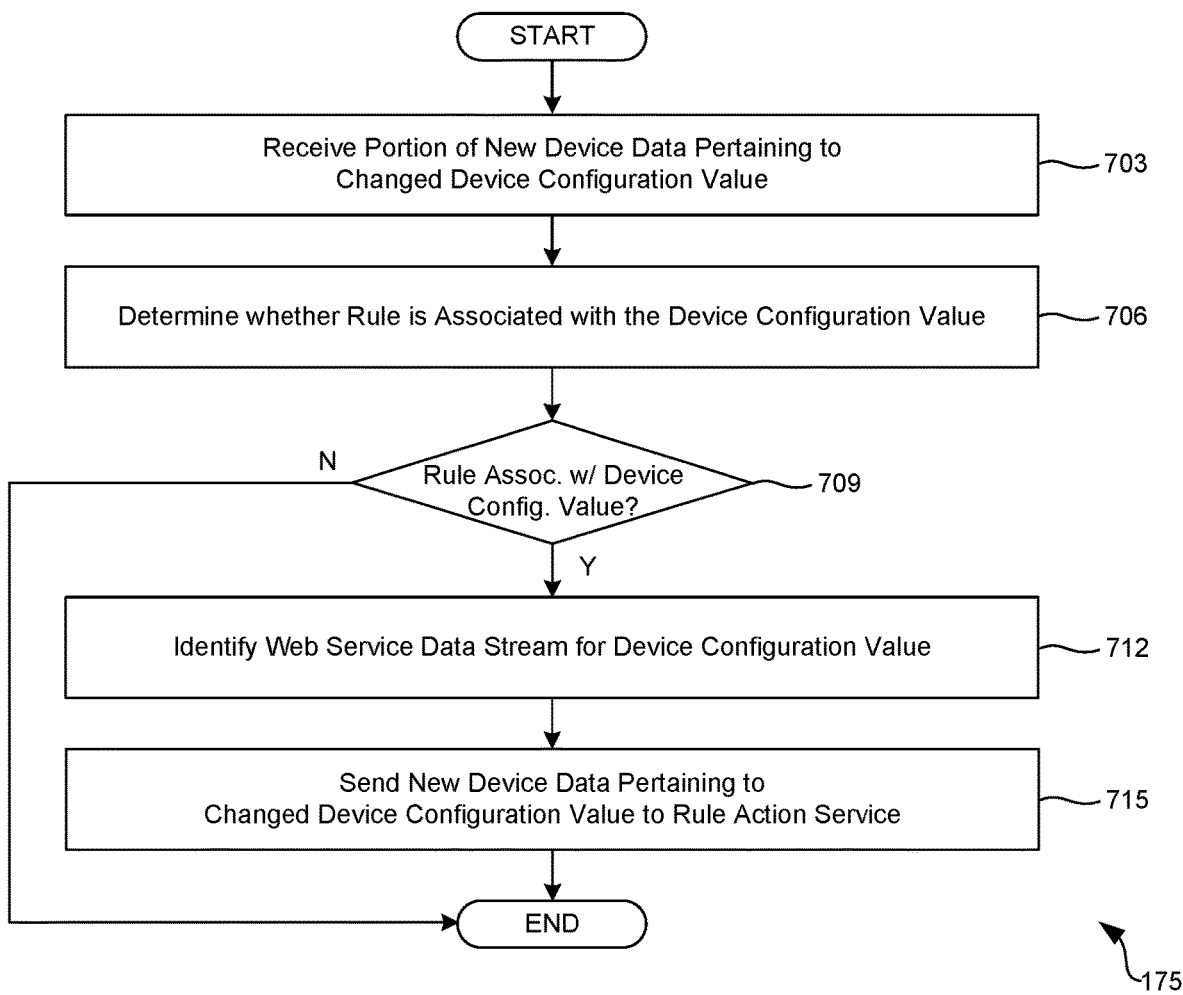
FIG. 7 is a flowchart showing an example operation of a rule evaluation service according to various examples.

Turning now to FIG. 7, a flowchart is shown that provides one example operation of a web service 169 according to various examples. The flowchart of FIG. 7 can be viewed as depicting an example of elements of a method implemented by the rule evaluation service 175 executing in the networked environment 100 according to one or more examples. The separation or segmentation of functionality as discussed herein is presented for illustrative purposes only.

In step 703, the rule evaluation service 175 can receive new device data 130 from the event-driven web service 172 or from one of the web service data streams 403. As can be appreciated, receipt of the new device data 130 from the event-driven web service 172 indicates that a change in a device configuration value 142 has been identified.

Thus, in step 706, the rule evaluation service 175 can determine whether a rule 151 existed that is associated with or otherwise pertains to a category or variable name of the device configuration value 142. For instance, if a configuration of a client device 106 changed a device configuration value 142 for "date_of_last_virus_scan" from "Jan. 31, 2020" to "Apr. 20, 2022," the rule evaluation service 175 can determine whether any rules 151 exist that are interested in the "date_of_last_virus_scan" category.

Thus, in step 709, if no rules 151 are identified as being associated with the device configuration value 142, the process can proceed to completion. Referring back to step 709, if one or more rules 151 are identified as being associated with the device configuration value 142, the process can proceed to step 712.

As one or more rules 151 have been identified as being associated with the device configuration value 173, the rule evaluations service 175 can route the new device data 130 to an appropriate web service 169 that analyses rules 151 pertaining to the device configuration value 173. Thus, in step 712, the rule evaluation service 175 can identify a web service data stream 403 for the device configuration value 142. For instance, a first web service data stream 403a can receive data associated with changes to "date_of_last_virus_scan" settings while a second web service data stream 403b can receive data associated with changes to "is_anti_virus_installed" settings.

In step 715, the rule evaluation service 175 can communicate the new device data 130 to the rule action service 178 through the web service data stream 403 identified in step 712. Thereafter, the process can proceed to completion.

Figure 8:
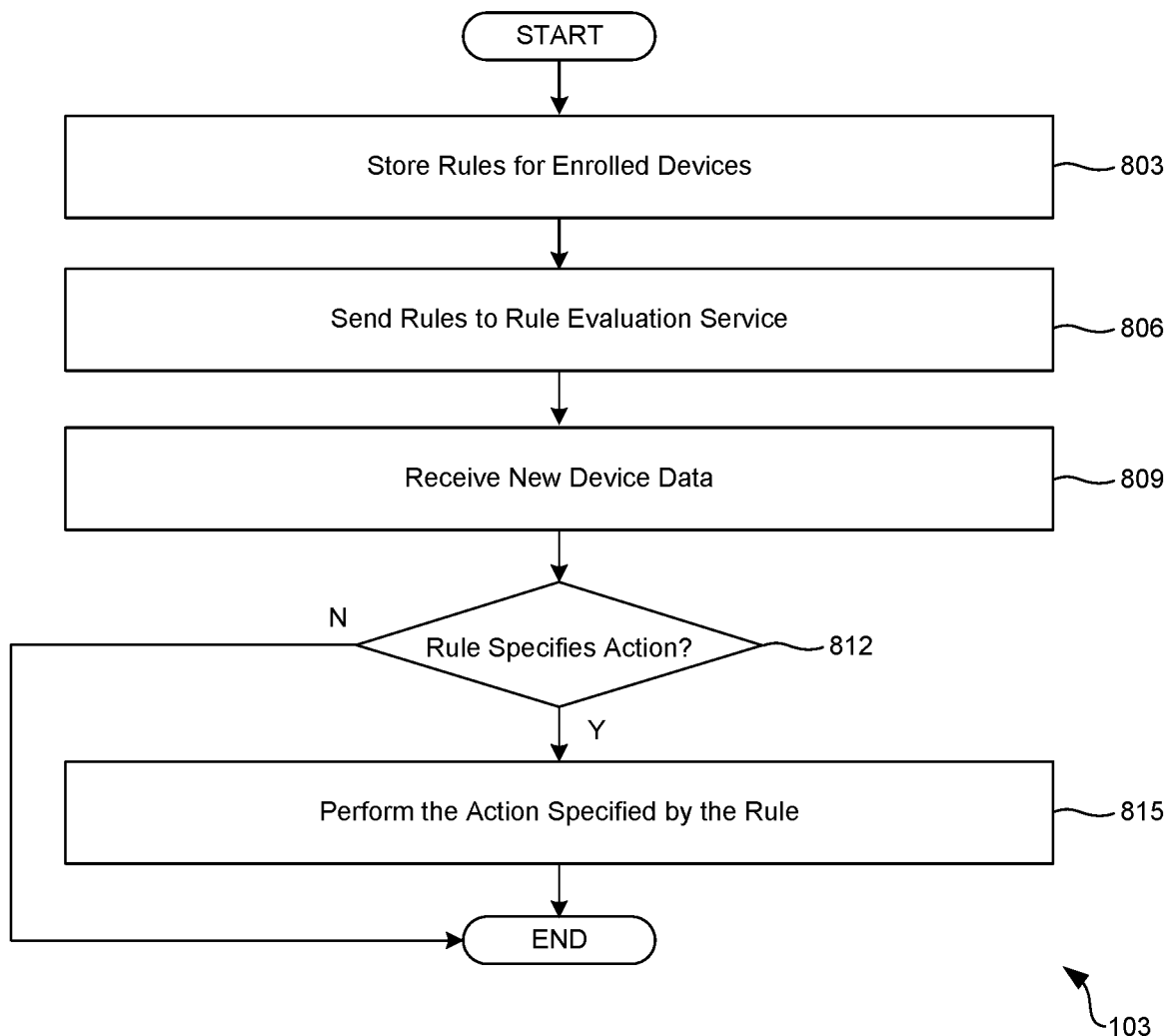
FIG. 8 is a flowchart showing an example operation of a rule action service according to various examples.

Referring next to FIG. 8, a flowchart is shown that provides one example operation of a web service 169 according to various examples. The flowchart of FIG. 8 can be viewed as depicting an example of elements of a method implemented by the rule action service 178 executing in the networked environment 100 according to one or more examples. The separation or segmentation of functionality as discussed herein is presented for illustrative purposes only.

An administrator can access an administrator device 504 to define rules 151 for client devices 106 enrolled with the management service 115, where the administrator device 504 can include one of the client devices 106 having administrator privileges. The administrator can specify the rules 151 using the user interfaces 200 of FIGS. 2 and 3, or other similar user interfaces 200 in some examples. It is understood that the management service 115 can store the rules 151 as administrator rule data 148.

Beginning with step 803, the rule action service 178 can access rules 151 specified by an administrator and store the rule 151 locally or in the data store 112 for future access. Additionally, in step 806, the rule 151 can be sent to the rule evaluation service 175 for local storage. In step 809, the rule action service 178 can receive the new device data 130 from the rule evaluation service 175 or one of the web service data streams 403.

In step 812, the rule action service 178 can identify the rule 151 corresponding to the change in the device configuration value 143 and determine whether the rule 151 specifies an action 153 to be performed. If the rule 151 does not specify an action 153 that needs to be performed, the process can proceed to completion, as can be appreciated. Referring back to step 812, if the rule 151 specifies an action 153 that needs to be performed, the process can proceed to step 815. It is understood that, in some examples, step 812 can include comparing the new device data 130 to the rule 151, for instance, to identify which action 153 to perform based on the device configuration value 143 in the new device data 130.

In some examples, the action 153 can include disabling functionality of the client device 106, causing a remedial action to be performed on the client device 106, or otherwise communicating with a third-party web service 180 configured to carry out a particular task. In step 815, the rule action service 178 can perform the action 153 (if able to be performed by the rule action service 178), or can direct an appropriate service to carry out performance of the action 153. For example, the rule action service 178 can be configured to send a request to one or more third-party web services 180 that causes an email, text message, or push notification to be sent to the operator to the client device 106 having information associated with the change to the client device 106.

In some examples, the rule action service 178 can generate, depending on the type of third-party web service 180 to be used in performing an action, a request 135 having a payload generated in accordance with specifications of the third-party web service 180. Thereafter, the process can proceed to completion. It is understood, however, that the process can revert back to step 512, for instance, in response to a change in the configuration of the client device 106.

The client devices 106 or devices comprising the computing environment 103 can include at least one processor circuit, for example, having a processor and at least one memory device, both of which are coupled to a local interface, respectively. The device can include, for example, at least one computer, a mobile device, smartphone, computing device, or like device. The local interface can include, for example, a data bus with an accompanying address/control bus or other bus structure.

Stored in the memory device are both data and several components that are executable by the processor. In particular, stored in the one or more memory devices and executable by the device processor can be the client application 125 and potentially other applications. Also stored in the memory can be a data store 112 and other data.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 106 can include a display 136 upon which a user interface 200 generated by the client application 125 or another application can be rendered. In some examples, the user interface 200 can be generated using user interface data provided by the computing environment 103. The client device 106 can also include one or more input/output devices that can include, for example, a capacitive touchscreen or other type of touch input device, fingerprint reader, or keyboard.

Although the management service 115, the client application 125, the agent application 126, the web services 169, and other various systems described herein can be embodied in software or code executed by general-purpose hardware as discussed above, as an alternative the same can also be embodied in dedicated hardware or a combination of software/general-purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program instructions, program code, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system, comprising:
at least one computing device comprising at least one hardware processor; and
program instructions stored in memory and executable in the at least one computing device that, when executed, direct the at least one computing device to:
receive a specification of an automation to perform in association with at least one of a plurality of devices enrolled with a remote management service, the automation comprising a rule, a device configuration value, and at least one action to perform based on the rule and the device configuration value, the automation being received over a network from an administrator device and being specified in an administrator console served up by the remote management service;
send the automation comprising the rule, the device configuration value, and the at least one action over the network to a rule evaluation service for local storage by the rule evaluation service;
receive device data from a client device, the device data indicative of a current configuration of the client device, the client device being one of the plurality of devices enrolled with the remote management service;
determine that at least a portion of the device data is new device data based on a comparison of the device data to historic device data previously received from the client device;
identify a change of the device configuration value from a past device configuration value by comparing the new device data to the historic device data;
in an instance in which the change of the device configuration value is identified, communicate the new device data to the rule evaluation service to identify the rule associated with the device configuration value; and
in an instance in which the rule associated with the device configuration value is identified, communicate the new device data to a rule action service to perform the at least one action, the at least one action being determined by the rule action service based at least in part on the device configuration value.

2. The system of claim 1, wherein the rule evaluation service is a first remotely-hosted web service and the rule action service is a second remotely-hosted web service, wherein the first remotely-hosted web service is an independent web service from the rule action service.

3. The system of claim 2, wherein the change of the device configuration value from the past device configuration value is identified by a third remotely-hosted web service independent from the first remotely-hosted web service and the second remotely-hosted web service.

4. The system of claim 3, wherein the third remotely-hosted web service is an event-driven web service configured to execute upon receipt of the new device data.

5. The system of claim 1, wherein the new device data is communicated to the rule action service by the rule evaluation service through a web service data stream.

6. The system of claim 5, wherein:
the web service data stream is one of a plurality of web service data streams; and
the rule evaluation service is configured to identify the one of the plurality of web service data streams through which the new device data is communicated based on a category of the device configuration value.

7. The system of claim 1, wherein the at least one action comprises sending data associated with the device configuration value to at least one third-party web service.

8. A non-transitory computer-readable medium embodying program instructions executable in at least one computing device that, when executed by the at least one computing device, direct the at least one computing device to:
receive a specification of an automation to perform in association with at least one of a plurality of devices enrolled with a remote management service, the automation comprising a rule, a device configuration value, and at least one action to perform based on the rule and the device configuration value, the automation being received over a network from an administrator device and being specified in an administrator console served up by the remote management service;
send the automation comprising the rule, the device configuration value, and the at least one action over the network to a rule evaluation service for local storage by the rule evaluation service;
receive device data from a client device indicative of a current configuration of the client device, the client device being one of the plurality of devices enrolled with the remote management service;

determine that at least a portion of the device data is new device data based on a comparison of the device data to historic device data previously received from the client device;

identify a change of the device configuration value from a past device configuration value by comparing the new device data to the historic device data;

in an instance in which the change of the device configuration value is identified, communicate the new device data to the rule evaluation service to identify the rule associated with the device configuration value; and in an instance in which the rule associated with the device configuration value is identified, communicate the new device data to a rule action service to perform the at least one action, the at least one action being determined by the rule action service based at least in part on the device configuration value.

9. The non-transitory computer-readable medium of claim 8, wherein the rule evaluation service is a first remotely-hosted web service and the rule action service is a second remotely-hosted web service, wherein the first remotely-hosted web service is an independent web service from the rule action service.

10. The non-transitory computer-readable medium of claim 9, wherein the change of the device configuration value from the past device configuration value is identified by a third remotely-hosted web service independent from the first remotely-hosted web service and the second remotely-hosted web service.

11. The non-transitory computer-readable medium of claim 10, wherein the third remotely-hosted web service is an event-driven web service configured to execute upon receipt of the new device data.

12. The non-transitory computer-readable medium of claim 8, wherein the new device data is communicated to the rule action service by the rule evaluation service through a web service data stream.

13. The non-transitory computer-readable medium of claim 12, wherein:

the web service data stream is one of a plurality of web service data streams; and the rule evaluation service is configured to identify the one of the plurality of web service data streams through which the new device data is communicated based on a category of the device configuration value.

14. The non-transitory computer-readable medium of claim 8, wherein the at least one action comprises sending data associated with the device configuration value to at least one third-party web service.

15. A computer-implemented method for providing multiple instances of a client application on a client device, comprising:

receiving a specification of an automation to perform in association with at least one of a plurality of devices enrolled with a remote management service, the automation comprising a rule, a device configuration value, and at least one action to perform based on the rule and the device configuration value, the automation being received over a network from an administrator device and being specified in an administrator console served up by the remote management service;

sending the automation comprising the rule, the device configuration value, and the at least one action over the network to a rule evaluation service for local storage by the rule evaluation service;

receiving device data from a client device indicative of a current configuration of the client device, the client device being one of the plurality of devices enrolled with the remote management service;

determining that at least a portion of the device data is new device data based on a comparison of the device data to historic device data previously received from the client device;

identifying a change of the device configuration value from a past device configuration value by comparing the new device data to the historic device data;

in an instance in which the change of the device configuration value is identified, communicating the new device data to the rule evaluation service to identify the rule associated with the device configuration value; and in an instance in which the rule associated with the device configuration value is identified, communicating the new device data to a rule action service to perform the at least one action, the at least one action being determined by the rule action service based at least in part on the device configuration value.

16. The computer-implemented method of claim 15, wherein the rule evaluation service is a first remotely-hosted web service and the rule action service is a second remotely-hosted web service, wherein the first remotely-hosted web service is an independent web service from the rule action service.

17. The computer-implemented method of claim 16, wherein the change of the device configuration value from the past device configuration value is identified by a third remotely-hosted web service independent from the first remotely-hosted web service and the second remotely-hosted web service.

18. The computer-implemented method of claim 17, wherein the third remotely-hosted web service is an event-driven web service configured to execute upon receipt of the new device data.

19. The computer-implemented method of claim 15, wherein the new device data is communicated to the rule action service by the rule evaluation service through a web service data stream.

20. The computer-implemented method of claim 19, wherein:

the web service data stream is one of a plurality of web service data streams;

the rule evaluation service is configured to identify the one of the plurality of web service data streams through which the new device data is communicated based on a category of the device configuration value; and the at least one action comprises sending data associated with the device configuration value to at least one third-party web service.

* * * * *